(No Model.)

A. H. SPAULDING.
CENTRIFUGAL BOLTING REEL.

No. 295,453. Patented Mar. 18, 1884.

Witnesses:
Phil C. Dietrich
W. R. Keyworth

Inventor:
Albert H. Spaulding
by
J. H. Alexander
Attorney.

UNITED STATES PATENT OFFICE.

ALBERT H. SPAULDING, OF SILVER CREEK, NEW YORK.

CENTRIFUGAL BOLTING-REEL.

SPECIFICATION forming part of Letters Patent No. 295,453, dated March 18, 1884.

Application filed June 20, 1883. (No model.)

*To all whom it may concern:*

Be it known that I, ALBERT H. SPAULDING, of Silver Creek, in the county of Chautauqua and State of New York, have invented certain new and useful Improvements in Centrifugal Bolting-Reels; and I do hereby declare that the following is a full, clear, and exact description thereof, reference being had to the accompanying drawings, and to the letters of reference marked thereon, which form part of this specification, in which—

Figure 1:
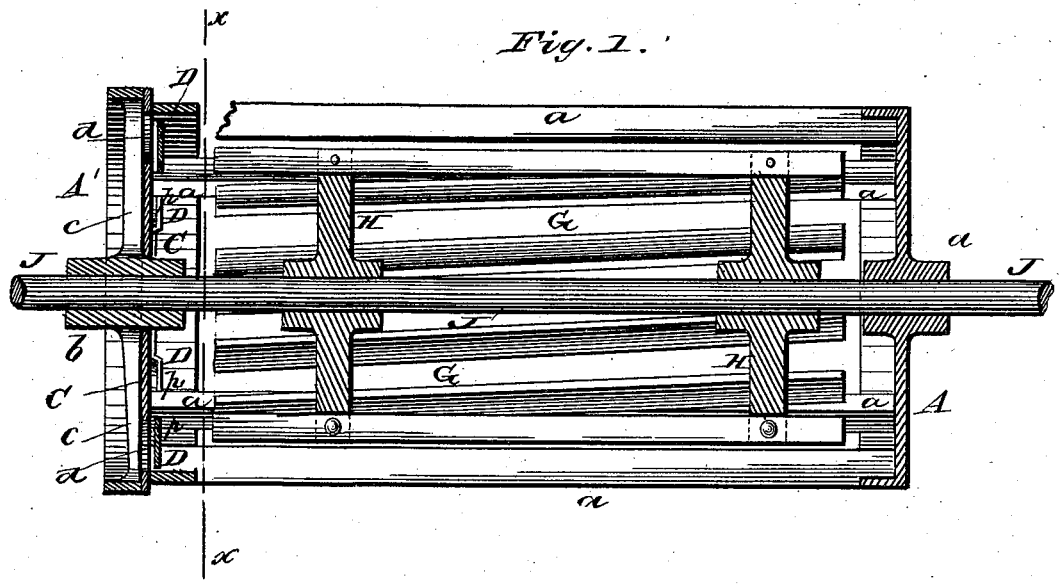
Figure 2:
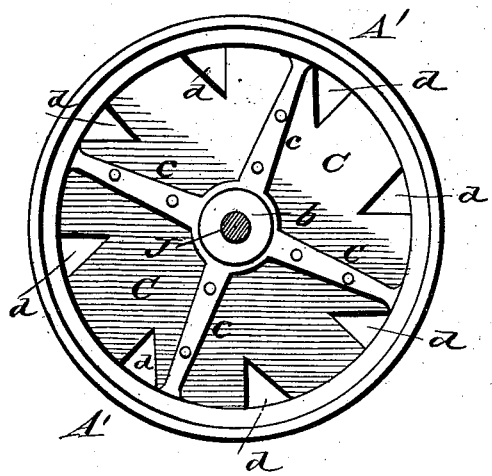
Figure 3:
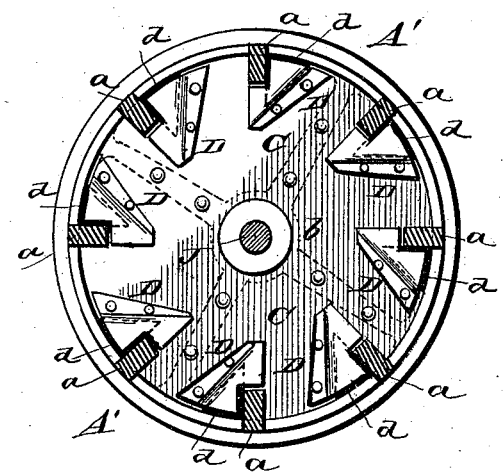
Figure 4:
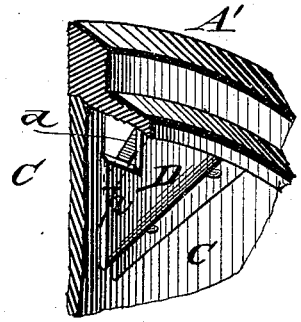

Figure 1 is a diametrical section through my improved centrifugal bolting-reel, showing the guarding-hoods applied to the tail of the reel. Fig. 2 is a view of the reel looking at the tail end thereof. Fig. 3 is a cross-section through the reel, taken in the vertical plane indicated by dotted line *x x* on Fig. 1. Fig. 4 is a perspective view in detail, showing one of the hoods or guards extending over a discharge-opening.

My invention relates to that class of machines for bolting flour which are known as "centrifugal" flour dressers or bolts, wherein rapidly-rotating beating-blades are arranged inside of a cloth-covered bolting-reel; and the main object of it is to effectually prevent the fine particles of flour from being blown out through the apertures, which are provided through the tail of the reel for the discharge of the offal—such, for instance, as the bran, &c.—as will be fully understood from the following description when taken in connection with the annexed drawings.

A A' designate the heads or ends of my centrifugal bolting-reel, which are connected by ribs or slats *a*, arranged at regular intervals apart, and rigidly secured to the said ends or heads in any suitable manner, so that their flat sides are in planes radiating from the center of the reel, as shown in Fig. 3. These ribs or slats are parallel to each other, and surrounding them is the bolting-cloth, which is secured to the said heads in the usual well-known manner. The feed may be that common to bolting-reels.

The tail A' consists of a flanged rim, which is secured to a hub, *b*, by means of radial spokes *c*, inside of which is bolted or otherwise secured a sheet-metal plate, C, through which are apertures *d* for the discharge of the offal, resulting from the bolting process.

On the inner side of the reel, and suitably secured to the plate C, are hoods or guards D, which are provided for each aperture *d*. Each hood or guard D is so constructed that it will set off or flare inwardly from the plate C and form a shield for its respective aperture, as shown at *p* in Figs. 1 and 4 of the drawings.

It is well known that in the dusting or bolting of flour with the old and well-known machines the flour or fine material is forced out through the aperture or apertures through which the offal is discharged. By the invention which I have above described the fine flour is prevented from escaping, still the offal is allowed to discharge freely.

Inside of the reel proper I have arranged the well-known beating-blades G, which are secured to heads H H, so that they are oblique to the axis of a shaft, J. These beaters are designed for throwing off by centrifugal action the material against the inside of the bolting-cloth. The beaters are rotated very rapidly with respect to the rotation of the bolting-reel proper; hence there will necessarily be strong currents of air generated inside of the reel by said beaters, which in fact operate like a fan; hence I have employed the bonnets, hoods, or wind-guards to prevent said currents from expelling the fine flour from the tail end of the reel. In practice I shall extend the said guards sufficiently far over the discharge-apertures to effectually prevent the escape of the flour.

It will be observed that the bonnets, hoods, or wind-guards are V-shaped, and that they are secured directly to the tail C inside thereof, so as to extend well over the V-shaped outlets *d*, and to serve as inclined deflectors for preventing the blasts of air from blowing the fine flour out of the reel.

It is very important that the discharge-apertures be located at the bolting-cloth—that is to say, at the circumference of the reel, in order that the hoods or guards shall pick up the bran or offal which is too coarse to pass through the bolting-cloth and deflect it into the discharge-apertures, said bran or offal being forced along by the obliquely-arranged beaters or blades G to the tail end of the reel, while the flour passes through the bolting-cloth.

It will be observed that the apertures are arranged close to the bolting-cloth, so that the hoods or guards will pick up the offal at the lowest point of the reel.

I am well aware that scoops or an endless chain of buckets have been employed for the purpose of removing the offal from the reel during the process of bolting; but such devices do not serve as hoods or guards, and they will not prevent the escape of the fine flour.

Having thus fully described my invention, what I claim as new, and desire to secure by Letters Patent, is—

The combination, in a centrifugal flour-bolt, of the reel provided with heads A A', the tail or discharge head A' having a series of apertures through it, located at the circumference thereof, and interior wind-guards applied over said apertures, with the rotating beaters G, substantially in the manner and for the purposes described.

In testimony that I claim the foregoing as my own I affix my signature in presence of two witnesses.

ALBERT H. SPAULDING.

Witnesses:
T. H. ALEXANDER,
W. R. KEYWORTH.